United States Patent
Heddy, III

(10) Patent No.: US 9,856,744 B2
(45) Date of Patent: Jan. 2, 2018

(54) BAYONET SPACER RETENTION SYSTEM FOR VARIABLE TURBINE GEOMETRY VANE PACKS

(71) Applicant: BorgWarner Inc., Auburn Hills, MI (US)

(72) Inventor: George E. Heddy, III, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 205 days.

(21) Appl. No.: 14/397,969

(22) PCT Filed: Apr. 22, 2013

(86) PCT No.: PCT/US2013/037561
§ 371 (c)(1),
(2) Date: Oct. 30, 2014

(87) PCT Pub. No.: WO2013/165723
PCT Pub. Date: Nov. 7, 2013

(65) Prior Publication Data
US 2015/0125288 A1    May 7, 2015

Related U.S. Application Data

(60) Provisional application No. 61/642,558, filed on May 4, 2012.

(51) Int. Cl.
*F01D 17/16*    (2006.01)
*F02B 37/24*    (2006.01)
*F02B 39/00*    (2006.01)

(52) U.S. Cl.
CPC ............ *F01D 17/165* (2013.01); *F02B 37/24* (2013.01); *F02B 39/00* (2013.01);
(Continued)

(58) Field of Classification Search
CPC ........ F01D 17/162; F04D 29/46; F04D 29/56; F04D 29/462; F04D 29/466; F16L 37/24;
(Continued)

(56) References Cited

U.S. PATENT DOCUMENTS 3,314,595 A * 4/1967 Burge ................... F01D 17/162
                                                    415/160
3,709,086 A * 1/1973 Johnson .................. F16B 21/04
                                                    411/551
(Continued)

FOREIGN PATENT DOCUMENTS

DE    102007040679 A1 *  3/2009 ........... F01D 17/146
FR       2721074 A1 * 12/1995 ......... B66B 11/0253
(Continued)

OTHER PUBLICATIONS

English Translation of FR 2721074.*
(Continued)

*Primary Examiner* — Woody Lee, Jr.
*Assistant Examiner* — Topaz L Elliott
(74) *Attorney, Agent, or Firm* — BrooksGroup

(57) ABSTRACT

A variable geometry turbocharger includes a vane pack having rotatable vanes constrained by a pair of vane rings connected by a plurality of spacer connectors. The spacer connectors can include a spacer body for maintaining a minimum spacing between the vane rings. The spacer connectors are configured for bayonet mounting to at least one of the vane rings. To that end, the spacer connectors can include shaft portions extending from opposing sides of the spacer body. A plurality of transverse protrusions can extend outwardly from each shaft portion. Each shaft portion can be received in a respective in a vane ring. The spacer connectors can be rotated such that the transverse protrusions are offset from aperture portions that allow passage of the
(Continued)

transverse portions, thereby retaining the vane rings in place in spaced relation. Such a system avoids close tolerances, press fits, expensive bolted joints or weld processes.

19 Claims, 6 Drawing Sheets

(52) U.S. Cl.
CPC ...... *F05D 2220/40* (2013.01); *F05D 2260/33* (2013.01); *Y02T 10/144* (2013.01); *Y10T 29/49323* (2015.01)

(58) Field of Classification Search
CPC .. F16L 37/107; F05D 2220/40; Y02T 10/144; F02B 39/00; F05B 2260/33; F05B 2260/303; F16B 21/04
USPC .......................................................... 403/348
See application file for complete search history.

(56) References Cited

U.S. PATENT DOCUMENTS

| | | | | |
|---|---|---|---|---|
| 3,939,651 A * | 2/1976 | Penny | ................... | F01D 25/243 285/209 |
| 4,917,525 A * | 4/1990 | Duncan | ................ | H01R 13/625 285/93 |
| 4,948,315 A * | 8/1990 | Limberis | ................... | F16B 5/10 24/287 |
| 5,149,149 A | 9/1992 | Wu | | |
| 5,255,827 A * | 10/1993 | Breault | ................... | B05B 1/306 222/309 |
| 5,272,900 A | 12/1993 | Robbins | | |
| 6,261,042 B1 * | 7/2001 | Pratt | ........................ | F16B 5/10 411/551 |
| 7,371,047 B2 * | 5/2008 | Burmester | .............. | F01D 9/026 415/204 |
| 7,399,156 B2 * | 7/2008 | Sterner | ................. | F01D 17/165 415/134 |
| 7,431,560 B2 * | 10/2008 | Sterner | ................. | F01D 17/165 415/160 |
| 7,753,591 B2 * | 7/2010 | Petitjean | ................. | F01D 25/16 384/397 |
| 8,061,976 B2 * | 11/2011 | Hall | ...................... | B23P 19/084 415/160 |
| 8,262,346 B2 * | 9/2012 | Wengert | ................ | F01D 17/165 415/163 |
| 2004/0126183 A1 * | 7/2004 | Steiner | ................. | B26D 7/1818 403/348 |
| 2008/0193281 A1 | 8/2008 | Sausse et al. | | |
| 2008/0260520 A1 | 10/2008 | Hettinger et al. | | |
| 2009/0022580 A1 | 1/2009 | Hall | | |
| 2009/0252601 A1 * | 10/2009 | Wengert | ................ | F01D 17/165 415/163 |
| 2010/0008774 A1 * | 1/2010 | Scholz | ................... | F01D 9/041 415/209.3 |
| 2012/0120659 A1 * | 5/2012 | Lopez | ................... | F21V 19/045 362/249.02 |
| 2012/0328422 A1 * | 12/2012 | Lischer | ................... | F01D 9/026 415/182.1 |

FOREIGN PATENT DOCUMENTS

| | | | | |
|---|---|---|---|---|
| JP | | 63198702 | 8/1988 | |
| WO | WO 2011084282 A2 * | | 7/2011 | ............. F01D 9/026 |

OTHER PUBLICATIONS

English translation of DE 102007040679.*
Chinese Office Action dated Apr. 26, 2017 ; Application No. 201380020531.0; Applicant: BorgWarner Inc.; 10 pages.
Chinese Office Action dated Oct. 11, 2017 ; Application No. 201380020531.0; Applicant: BorgWarner Inc.; 10 pages.

* cited by examiner

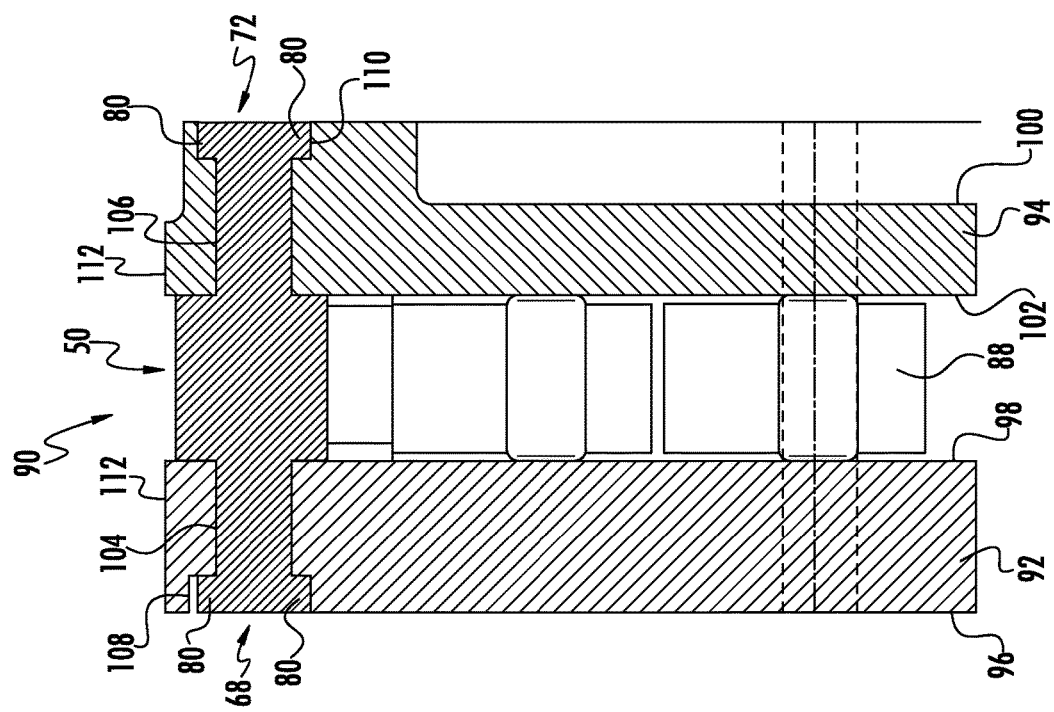

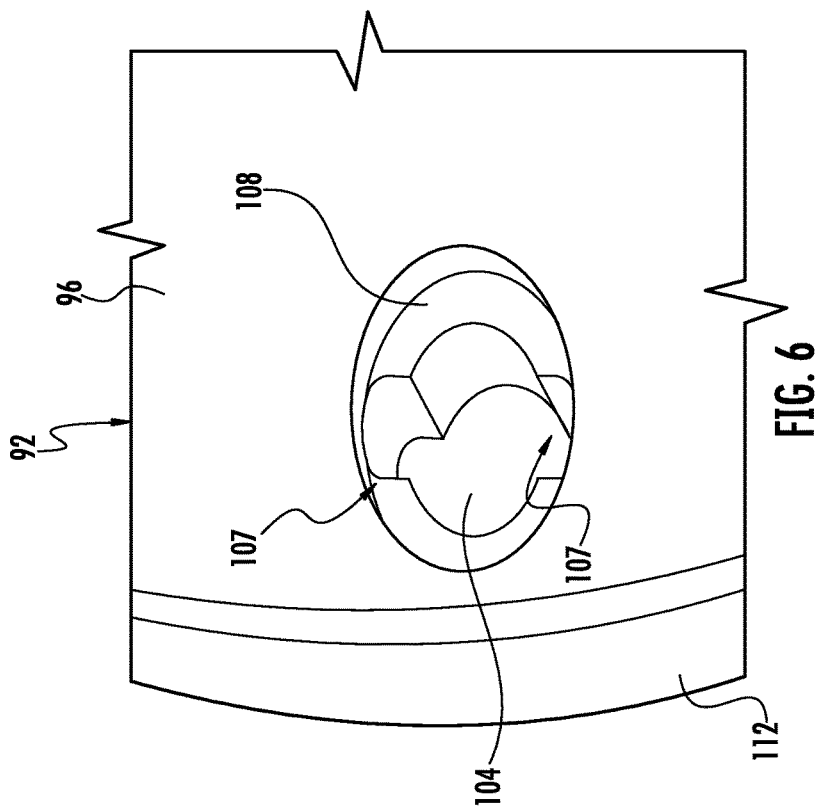
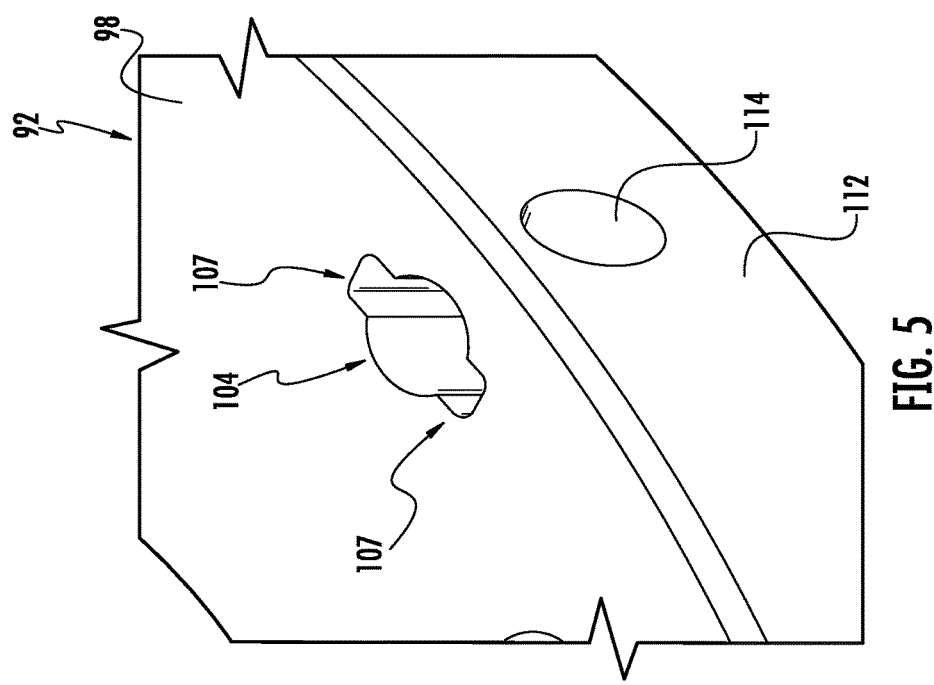

BAYONET SPACER RETENTION SYSTEM FOR VARIABLE TURBINE GEOMETRY VANE PACKS

FIELD OF THE INVENTION

Embodiments related in general to turbochargers and, more particularly, to vane packs for variable turbine geometry turbochargers.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of the vehicle.

FIG. 1 shows a typical variable geometry turbocharger (10). Generally, turbochargers (10) use the exhaust flow from the engine exhaust manifold to drive a turbine wheel (12), which is located in a turbine housing (14) to form a turbine stage (16). The energy extracted by turbine wheel (12) is translated to a rotating motion which then drives a compressor wheel (18), which is located in a compressor cover (20), to form a compressor stage (22). The compressor wheel (18) draws air into the turbocharger (10), compresses this air and delivers it to the intake side of the engine.

Variable geometry turbochargers typically use a plurality of rotatable vanes (24) to control the mass flow of exhaust gas which impinges on the turbine wheel (12) and control the power of the turbine stage (16). These vanes (24) also therefore control the pressure ratio generated by the compressor stage (22). In engines, which control the production of NOx by the use of High Pressure Exhaust Gas Recirculation (HP EGR) techniques, the function of the vane pack in a variable geometry turbocharger also provides a means for controlling and generating exhaust back pressure.

A plurality of vanes (24) is provided between a generally annular upper vane ring (UVR) (28), and a generally annular lower vane ring (LVR) (30). The assembly consisting of the plurality of vanes (24) and the two vane rings (28, 30) is typically known as the vane pack (26). Each vane (24) rotates on a pair of opposing axles (32), protruding from opposite sides of the vane (24) with the axles (32) on the same centerline. For each vane (24), one of the axles (32) is located in an aperture (34) in the LVR (30), and the other axle (32) is located in an aperture (36) in the UVR (28). The angular orientation of the UVR (28) is set such that the complementary apertures (34, 36) in the vane rings (28, 30) are concentric with the axles (32) of the vane (24). The vane (24) is free to rotate about the centerline of the two axles (32), which is concentric with the now established centerline of the two apertures (34, 36). Each axle (32) on the UVR side of the vane (24) protrudes through the UVR (28) and is affixed to a respective vane arm (38), which controls the rotational position of the vane (24) with respect to the vane rings (28, 30). Typically there is a separate unison ring which controls all of the vane arms (38) in unison. This unison ring is controlled by an actuator, which is typically commanded by the engine electronic control unit (ECU).

The clearance between the rotatable vanes (24), more specifically between the cheeks (40) of the vanes (24), and the inner surfaces (29, 31) of the upper and lower vane rings (28, 30), is a major contributor to a loss of efficiency in both the control of exhaust gas allowed to impinge on the turbine wheel (12) and in the generation of backpressure upstream of the turbine wheel (12). It is desirable to minimize the clearances between the vane cheeks (40) and the complementary inner surfaces (29, 31) of the vane rings (28, 30) and thus increase the efficiency of the vane pack (26). Unfortunately, the increase in efficiency due the side clearances is inversely proportional to the propensity of the vane pack (26) to wear, stick, or completely jam due to thermal deformation in the turbine housing (14) being transferred to the vane pack (26). So the vane pack (26) needs to be accurately placed and constrained within the turbine housing (14) in a manner which minimizes the transference of thermally induced distortion. While internal to the vane pack (26), the noted clearances need to be such that they maximize efficiency while minimizing the potential for sticking, jamming and wear.

In some VTGs, as depicted in FIG. 2, the LVR (30) is constrained against the turbine housing (14) by a plurality of bolts (42). The UVR (28) and the lower vane ring LVR (30) are held together by studs or bolts (44), which serve to apply a clamp load on the vane rings (28, 30), and on a plurality of spacers (46) placed between the vane rings (28, 30), such that the length of the spacer (46) determines the distance between the UVR (28) and the LVR (30), and thus the clearance between the cheeks (40) of the vanes (24) and the inner surfaces (29, 31) of the vane rings (28, 30). The bolts or studs (44) also serve to provide the angular orientation of the apertures (34, 36) in which the axles (32) of the vanes are constrained. However, such studs are difficult to secure so that they do not unscrew when subjected to vibration, especially in situations where there are high temperature (from 740° C. to 1050° C.). Similarly, in a situation where the temperature can range from below freezing to high combustion-like temperatures (from 740° C. to 1050° C.), it is difficult to maintain clamp load via a nut (48) so that the nut (48) does not come loose due to the differences in coefficients of thermal expansion between the materials of the components in the clamp load set. Thus, what may appear to be a simple clamping device (i.e., a nut and bolt) is actually a complicated engineering issue, which typically requires the use of exotic and expensive materials for the components so that the clamp load is maintained over the aforementioned range of temperatures.

In some VTGs, the LVR is constrained against the turbine housing by a plurality of spacers. The spacers include a shaft on opposite ends of the spacer. One shaft is pressed fit into a receiving aperture in the LVR, and the other shaft is press fit into a receiving aperture in the UVR. The spacers are held in place by the frictional force of the press fit between the shafts and apertures. However, during turbocharger operation, such a vane pack has experienced problems in that the spacers become separated from the vane rings.

During the assembly of the vane pack (26), much effort is spent to ensure that the correct components are used and that the correct clamp loads are applied. Thus, there is a need cost-effective and relatively fast way to apply the desired clamp load to a vane pack.

SUMMARY OF THE INVENTION

Embodiments herein can minimize the above problems by the using a plurality of spacer connectors. Each spacer connector can include a spacer body and first and second shaft portions that extend from opposite end faces of the spacer body. The shaft portions can have an outer peripheral surface. A plurality of transverse protrusions can extend from the outer peripheral surface of each shaft portion. Each shaft portion can be received in a respective aperture in a vane ring such that the transverse protrusions extend beyond the aperture. The spacer connectors can be rotated such that the transverse protrusions are offset from the apertures. As a result, the shaft portions are prevented from moving back through the apertures and vane ring axial spacing can be controlled by the spacer bodies. Such a system does not require close tolerances, press fits, expensive bolted joints or weld processes.

BRIEF DESCRIPTION OF THE DRAWINGS

Embodiments are illustrated by way of example and not limitation in the accompanying drawings in which like reference numbers indicate similar parts and in which:

FIG. 3 is an example of a connector spacer according to embodiments herein;

FIG. 4 is a cross-sectional view of a vane pack with a spacer according to embodiments herein;

FIG. 5 is a view of a portion of an inner surface of a vane ring, showing an aperture to receive a shaft portion of a connection spacer and an aperture to receive an anti-rotation pin;

FIG. 6 is a view of a portion of an outer surface of a vane ring, showing an aperture to receive a shaft portion of a connection spacer with a counterbore;

DETAILED DESCRIPTION OF THE INVENTION

Figure 1:
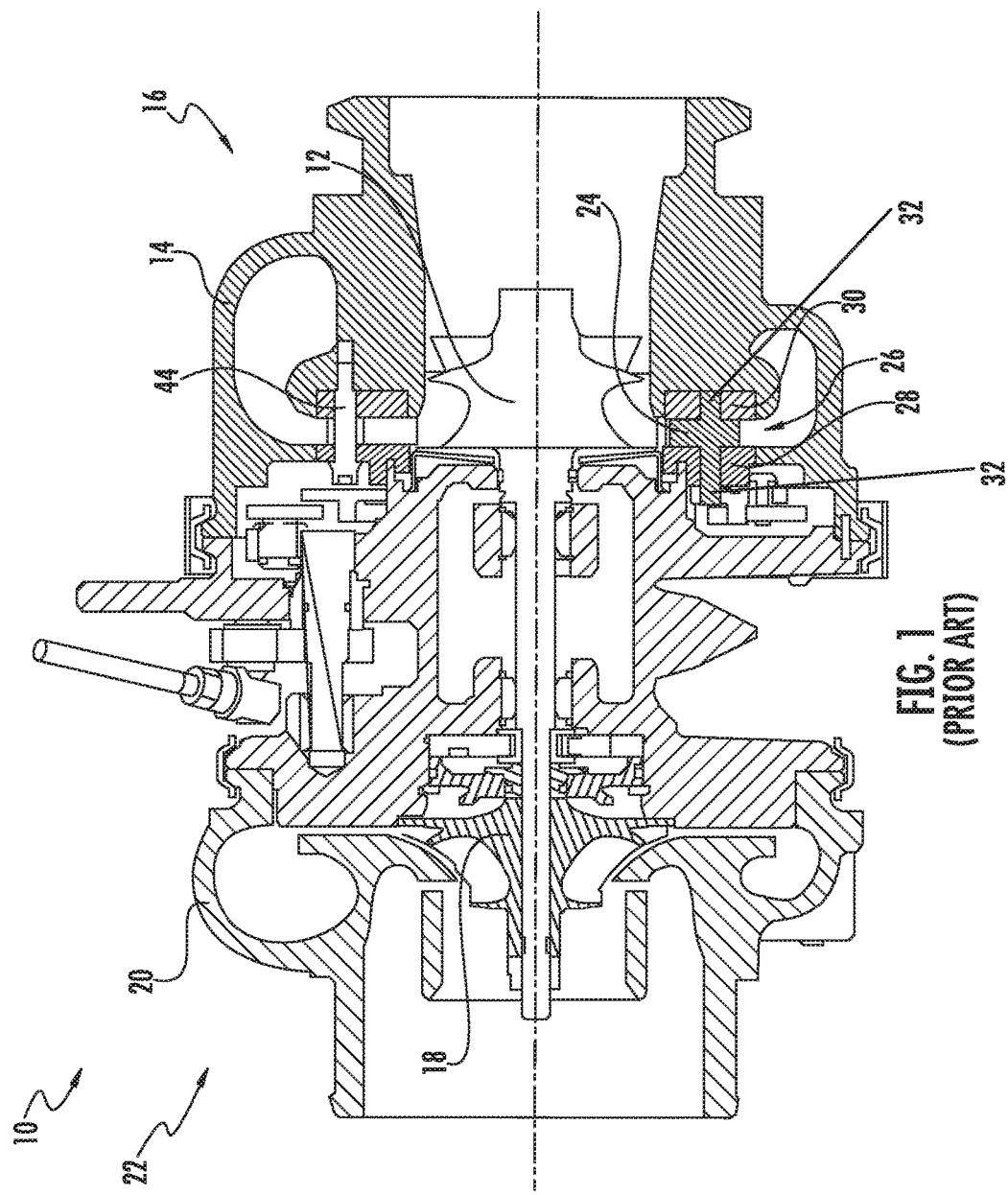
FIG. 1 shows a typical variable geometry turbocharger.
Figure 2:
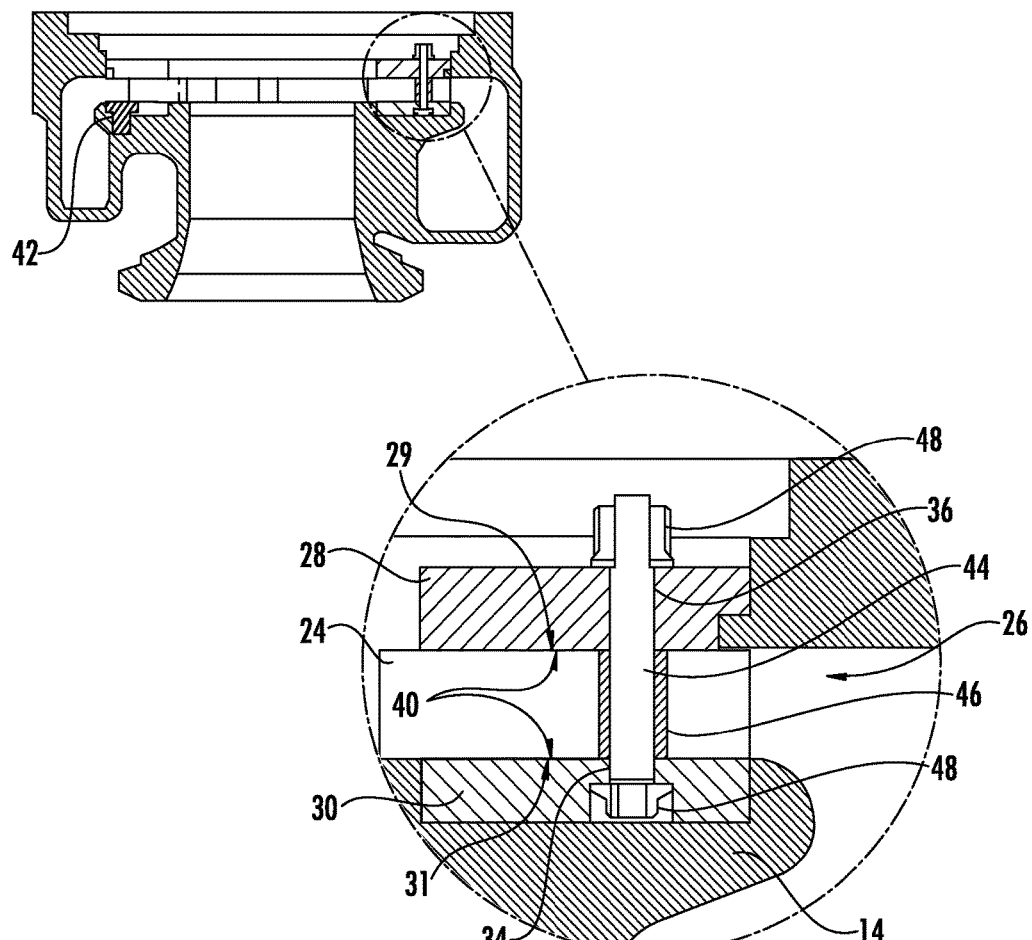
FIG. 2 is a section view and a further magnified view of a typical vane pack.
Figure 8:
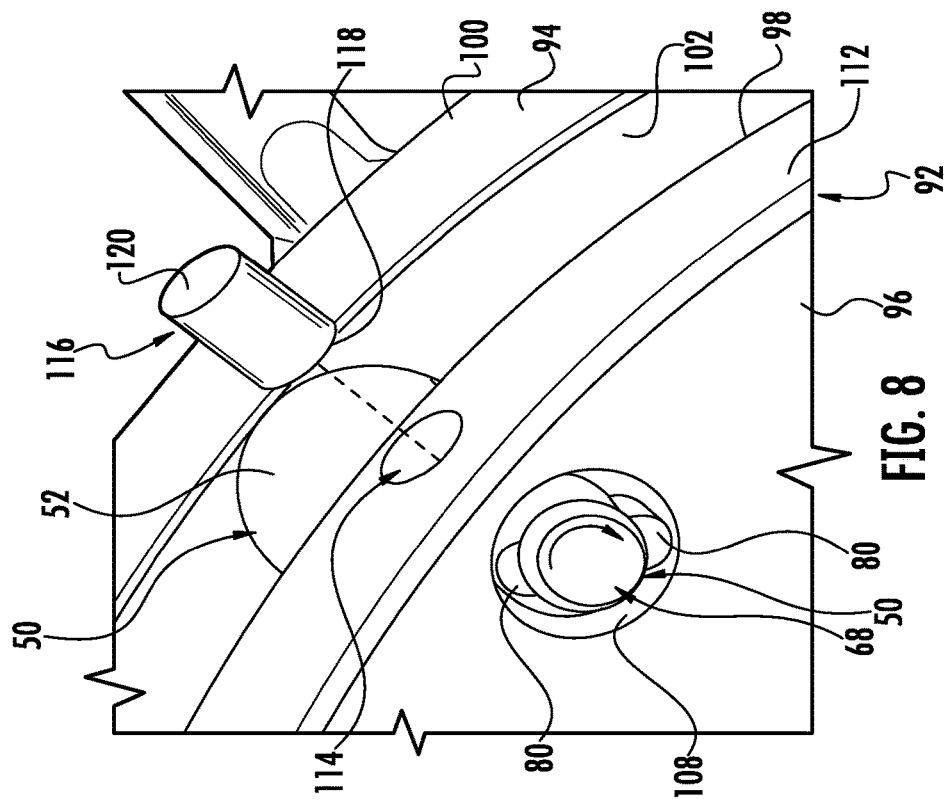
FIG. 8 is a view of an example of a portion of a vane pack according to embodiments herein.
Figure 7:
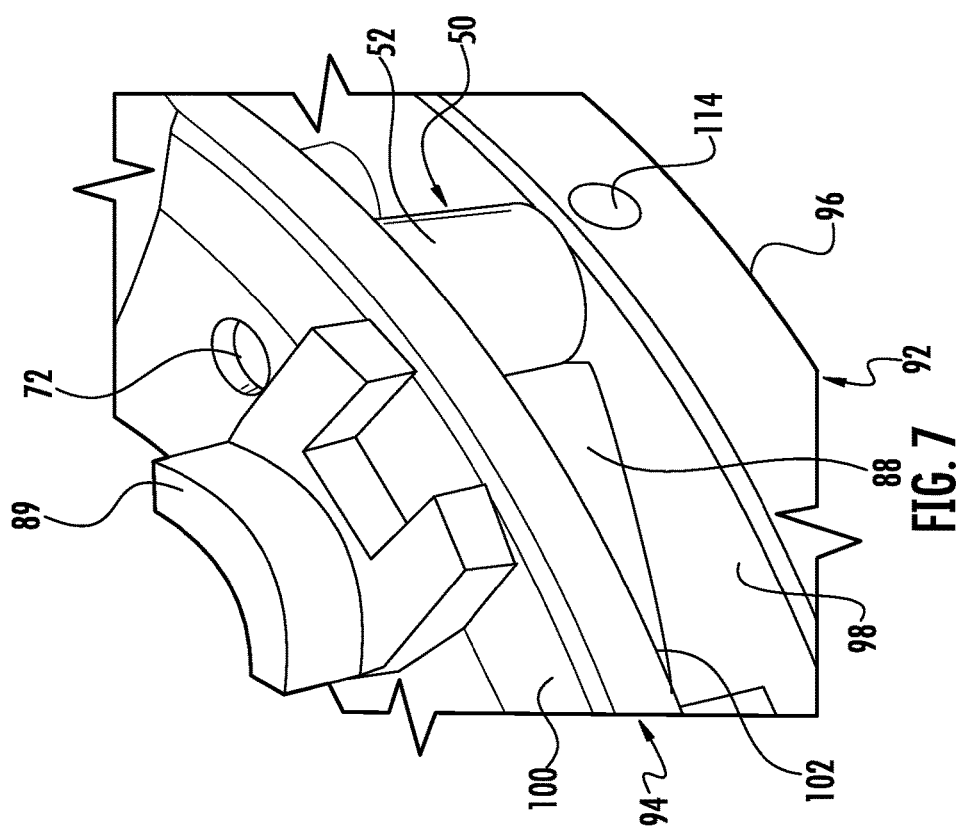
FIG. 7 is a partially exploded view of a portion of a vane pack according to embodiments herein.

Arrangements described herein relate to a retention system and method for a vane ring assembly. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 3-9, but the embodiments are not limited to the illustrated structure or application.

A vane pack according to embodiments herein can include a plurality of spacer connectors. The spacer connectors can have any suitable configuration. An example of one possible spacer connector (50) is shown in FIG. 3.

As is shown, the spacer connector (50) can include a spacer body (52), a first shaft portion (54) and a second shaft portion (56). The first and second shaft portions (54, 56) can extend from opposite end faces (58, 60) of the spacer body (52). The spacer body (52) can have any suitable configuration. For instance, the spacer body (52) can be substantially cylindrical, or it can have an aerodynamically efficient shape (e.g., an airfoil shape or a tear-drop like shape). The spacer body (52) can be a substantially symmetrical shape, or it may not be a symmetrical shape. The above-mentioned configurations are provided only as examples, as other suitable conformations for the spacer body (52) are possible.

The first shaft portion (54) and the second shaft portion (56) can be substantially aligned with each other such that the longitudinal axis (62) of the first shaft portion (54) is substantially coaxial with the longitudinal axis (64) of the second shaft portion (56). Further, the axes (62, 64) can be substantially coaxial with the spacer body (52). The first and second shaft portions (54, 56) can be substantially straight. The first and second shaft portions (54, 56) can have any suitable cross-sectional shape. For instance, the first and second shaft portions (54, 56) can be substantially circular in cross-sectional shape. The first and/or second shaft portions (54, 56) can have a substantially constant cross-sectional size and/or shape, or the cross-sectional size and/or shape of the first and/or second shaft portions (54, 56) can vary along at least a portion of their lengths. The first and second shaft portions (54, 56) can be substantially identical to each other, or they can be different from each other in one or more respects.

The first shaft portion (54) can have a proximal end (66) and a distal end (68). Likewise, the second shaft portion (56) can have a proximal end (70) and a distal end (72). The terms "proximal" and "distal" are used to note the position of the ends of the shaft portions (54, 56) relative to the spacer body (52). The first shaft portion (54) can have an outer peripheral surface (74), and the second shaft portion (56) can have an outer peripheral surface (76).

The spacer connectors (50) as can be configured for bayonet mounting to the upper and/or lower vane rings of a vane pack. As used herein, "bayonet mounting" and variants thereof is a manner of attachment between a male element having a plurality of projections and a female receptacle. The male element is received in the female receptacle and is rotated therein such that the projections become offset from those portions of the female receptacle configured to allow passage of the projections. In this way, the male element is prevented from being withdrawn from the female receptacle.

Various possible configurations are possible to achieve a bayonet mounting between the spacer connectors (50) and the vane rings. FIG. 3 shows one possible example. The distal end (68, 72) of the first and/or second shaft portions (54, 56) can be adapted to permit the spacer connector (50) to bayonet mount to the upper and lower vane rings of a vane pack. A plurality of transverse projections (78) can extend from the outer peripheral surface (74, 76) of the distal end (68, 72) of the first and/or second shaft portions (54, 56). It should be noted that the phrase "extend from the outer peripheral surface of the distal end" and variants thereof means that the transverse projections (78) can extend from the outer peripheral surface (74, 76) exactly at the respective distal end (68, 72) as well as from locations that are slightly spaced from the distal end (74, 76) toward the spacer body (52), such as is shown in FIG. 3. The transverse projections (78) can have any suitable form. As an example, the transverse projections (78) can be configured as lobes (80). The transverse projections (78) can have can an inner surface (82) that is substantially flat or is otherwise configured to substantially matingly engage a portion of a vane ring.

The transverse projections (78) can extend from the outer peripheral surface (74, 76) of the distal end (68, 72) in any suitable manner. For instance, the transverse projections (78) can extend substantially radially from the outer peripheral surface (74, 76) of the respective shaft portion (54, 56), that is, substantially radially from the axis (62, 64) of the respective shaft portion (54, 56). In one embodiment, the transverse projections (78) can extend at substantially 90 degrees from the outer peripheral surface (74, 76) of the respective shaft portion (54, 56), that is, substantially radially from the axis (62, 64) of the respective shaft portion (54, 56).

There can be any suitable quantity of transverse projections (78). In one embodiment, two transverse projections (78) can extend from the outer peripheral surface (74, 76) of the distal end (68, 72) of each shaft portion (54, 56). However, it will be appreciated that more than two transverse projections (78) can be provided. The plurality of transverse projections (78) can be distributed about the outer peripheral surface (74, 76) of the respective shaft portion (54, 56) in any suitable manner. For instance, the plurality of transverse projections (78) can be substantially equally spaced about the outer peripheral surface (74, 76) of the respective shaft portion (54, 56). Alternatively, the plurality of transverse projections (78) can be unequally spaced about the outer peripheral surface (74, 76) of the respective shaft portion (54, 56).

With respect to each shaft portion (54, 56), the plurality of transverse projections (78) can be substantially identical to each other, or at least one of the transverse projections (78) can be different from the other transverse projections (78) in one or more respects. Likewise, the transverse projections (78) that extend from the outer peripheral surface (74) of the first shaft portion (54) can be substantially identical to the transverse projections (78) that extend from the outer peripheral surface (76) of the second shaft portion (56). Alternatively, the transverse projections (78) that extend from the outer peripheral surface (74) of the first shaft portion (54) can be different from the transverse projections (78) that extend from the outer peripheral surface (76) of the second shaft portion (56) in one or more respects, including in any of those described herein. In one embodiment, each of the transverse projections (78) of the first shaft portion (54) can be substantially aligned with a respective one of the transverse portions (78) of the second shaft portion (56).

The spacer connector (50) can be made of any suitable material. For instance, the spacer connector (50) can be made of a 400 series stainless steel, Inconel 718 or Nimonic80A, just to name a few possibilities. The spacer connector (50) can be formed in any suitable manner, such as by machining.

The spacer connector (50) can be configured to minimize rotation of the spacer connector (50) when installed in its operational position. For instance, the first and/or second shaft portions (54, 56) of the spacer connector (50) can include a region (84) for engaging an anti-rotation element. For instance, the region (84) can be configured as a substantially flat surface (86) formed on at least one of the first and second shaft portions (54, 56). In one embodiment, only one of the shaft portions (54, 56) can include a flat surface (86) or other region (84) for engaging an anti-rotation element.

It should be noted that, while the spacer body (52) is shown in FIG. 3 as being formed together with the first and second shaft portions (54, 56) as a unitary structure, embodiments of the spacer connector (50) are not limited to such a configuration. Indeed, it will be appreciated that the spacer body (52) can be formed separately from the shaft portions (54, 56). In such case, the first and second shaft portions can be opposite portions of a single shaft (not shown). The separate spacer body can include a passage extending therethrough to accommodate the single shaft. The passage can be configured to allow the transverse projections to pass therethrough.

Referring to FIG. 4, a cross-sectional view of an example of a vane pack (90) configured according to embodiments herein is shown. The vane pack (90) can include a lower vane ring (LVR) (92) and an upper vane ring (UVR) (94). The terms "upper" and "lower" are used for convenience and are not intended to be limiting. The LVR (92) and the UVR (94) can be generally annular. The LVR (92) can have an outer surface (96) and an inner surface (98). Likewise, the UVR (94) can have an outer surface (100) and an inner surface (102). The term "inner" and "outer" are used with respect to the relative location of these surfaces to each other. Thus, the inner surfaces (98, 102) of the vane rings (92, 94) face toward each other, and the outer surfaces (96, 100) of the vane rings (92, 94) face away from each other.

A plurality of apertures (104) can be provided in the LVR (92), and a plurality of apertures (106) can be provided in the UVR (94). The apertures (104, 106) can form the female receptacle of the bayonet mount. The apertures (104, 106) can be configured to allow passage of a respective one of the first and second shaft portions (54, 56), including the transverse projections (78). To that end, the apertures (104, 106) can include portions (107) to accommodate the transverse projections (78). The portions (107) can have any suitable configuration. For instance, the portions (107) can be complementary shaped to the transverse projections (78). The LVR (92) can also include a counterbore (108) formed in the outer surface (96) thereof. The UVR (94) can also include a counterbore (110) formed in the outer surface (100) thereof.

One manner of assembling a vane pack (90) according to embodiments described herein will now be described. However, it will be understood that this manner described is provided as an example and embodiments are not limited to the particular method described. Further, the method of assembly may include other steps that are not described here, and the method is not limited to including every step described. In addition, the steps that are described herein as part of the assembly method are not limited to this particular chronological order, either. Indeed, some of the steps may be performed in a different order than what is described and/or at least some of the steps described can occur simultaneously.

The first shaft portion (54) of each spacer connector (50) can be inserted into one of the apertures (104) in the LVR (92) from the inner surface (98) side thereof. Such insertion can continue until the transverse projections (78) exit the aperture (104) on the outer surface (96) side of the LVR (92). As an example, the transverse projections (78) may be within the counterbore (108) of the LVR (92).

A plurality of vanes (88) can be provided. As is known in VTG turbochargers, a plurality of vanes (88) can be pivotably mounted between the UVR (94) and LVR (92). The vanes (88) can have vanes axles (not shown) that are received in respective apertures (not shown) in the LVR (92) and the UVR (94). The structure of the vanes (88) and their assembly/mounting within a vane pack is known and is equally applicable here.

The UVR (94) can be positioned such that each of the second shaft portions (56) of the spacer connectors (50) is received in one of the apertures (106) in the UVR (94) from the inner surface (102) side thereof. Relative movement between the second shaft portions (56) and the UVR (94) can continue until the transverse projections (78) exit the aperture (106) on the outer surface (100) side of the UVR (94). As an example, the transverse projections (78) may be within the counterbore (110) of the UVR (94).

The spacer connectors (50) can be rotated such that the transverse projections (78) at the distal ends (68, 72) of the shaft portions (54, 56) are offset from the apertures (104, 106) in the vane rings (92, 94). "Offset" includes no portion of the transverse projections (78) overlaps the portions (107) of the apertures (104, 106). "Offset" also includes instances in which the transverse projections overlap a minority of the portions (107) of the apertures (104, 106). Any suitable amount of rotation of the spacer connectors (50) can be performed. In one embodiment, the spacer connectors (50) can be rotated about 90 degrees relative to the portions (107) of apertures (104, 106). The inner surface (82) of the transverse projections (78) of the shaft portions (54, 56) can substantially matingly engage a portion of the respective vane ring, such as counterbores (108, 110).

As a result, the spacer connectors (50) operatively connect the vane rings (92, 94) via a bayonet mount. The spacer bodies (52) can control the axial distance between the inner surface (98) of the LVR (92) and the inner surface (102) of the UVR (94). The spacer bodies (52) can directly contact the LVR (92) at one of their ends and the UVR (94) at their opposite ends. A clamp load can be applied on the vane rings (92, 94) as a result of the engagement between the spacer connectors (50) and the vane rings (92, 94). The spacer connectors (50) can also maintain circumferential angular orientation of the vane rings (92, 94) with respect to each other to maintain substantial alignment between the apertures (not shown) for the vane axles (not shown) to avoid jamming of the vanes (88).

It will be appreciated that the distal ends (68, 72) of the first and/or second shaft portions (54, 56) can be substantially flush with the respective outer surface (96, 100) of the vane rings (92, 94). Alternatively, the distal ends (68, 72) of the first and/or second shaft portions (54, 56) can be recessed from the respective outer surface (96, 100) of the vane rings (92, 94), such as by being received in the respective counterbore (108, 110). In some instances, it may be possible for the distal ends (68, 72) of the first and/or second shaft portions (54, 56) to protrude beyond the respective outer surface (96, 100) of the vane rings (92, 94) so long as such protruding portions do not interfere with the range of motion of the vane arms (89) of the vane pack (90) (FIG. 7) and/or the turbine housing.

Once the spacer connector (50) is rotated into a suitable position, it will be appreciated that such a position should be substantially maintained. To that end, the vane pack can be configured to minimize rotation of the spacer connector (50). Anti-rotation of the spacer connector (50) can be achieved in any suitable manner. For instance, as noted above, the first and/or second shaft portions (54, 56) of the spacer connector (50) can include a region (84) for engaging an anti-rotation element (e.g., flat surface (86). Likewise, the vane rings (92, 94) can be configured to engage the region (84) or receive an anti-rotation element for engaging the region (84).

In one embodiment, a plurality of apertures (114) can be formed in an outer peripheral surface (112) of one of the vane rings, such as the LVR (92). An aperture (114) can be provided for each spacer connector (50). The aperture (114) can extend into communication with the aperture (104, 106) formed in the respective vane ring (92, 94). The aperture (114) can extend substantially radially in the respective vane ring.

An anti-rotation element, such as a pin (116), can be received in each aperture (114). The pin (116) can have any suitable configuration. In one embodiment, the pin (116) can be substantially straight and can have a generally circular cross-sectional shape. However, other configurations are possible. A first end (118) of the pin (116) can be brought into engagement (e.g., direct abutment) with the flat surface (86) of the spacer connector (50). Such engagement can minimize rotation of the spacer connector (50). The pin (116) can be held in place in the aperture (114) in any suitable manner, including by mechanical engagement, fasteners, adhesives and/or other suitable means. Alternatively or in addition, the pin (116) can be held in place by the turbine housing. When the vane pack is placed in the turbine housing, a second end (120) of the pin (116) as well as the outer peripheral surface (112) of the LVR (92) can directly contact the turbine housing, thereby preventing the pin (116) from back out of the aperture (114).

However, it should be noted that configurations herein may subject the vane pack (90) to new loads and create weak spots in the assembly. For instance, the inclusion of the aperture (114) in one or both of the vane rings (92, 94) can weaken these structures. The vane rings (92, 94) may be further weakened by the inclusion of portions (107) to the apertures (104, 106). The transverse projections (78) (e.g. lobes (80)) can also impose structure loads on the vane rings (92, 94). According to embodiments herein, the transverse projections (78) and the portions (107) can be arranged to minimize stress on one or both of the vane rings (92, 94).

Figure 9:
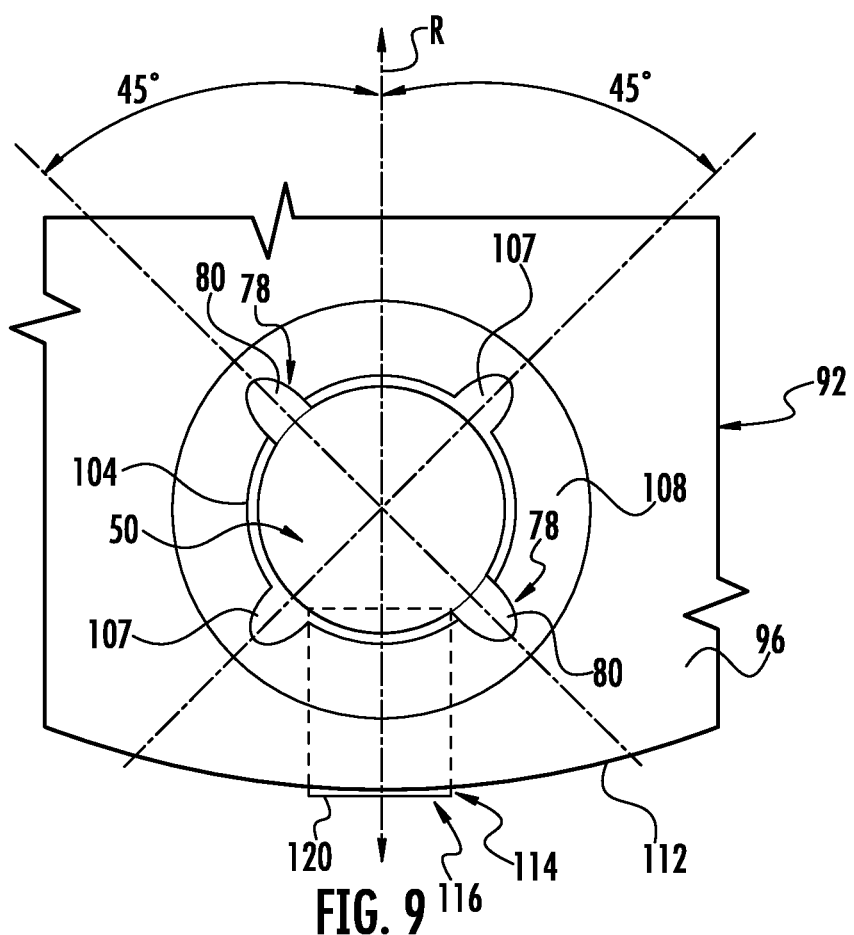
FIG. 9 is a view of an arrangement of a connection spacer in the vane pack.

To that end, the portions (107) of the apertures (104, 106) can be oriented at substantially 45 degrees to the radial direction (R), as is generally shown in FIG. 9. Further, the spacer connectors (50) can be rotated about 90 degrees from the portions (107). As a result, the final position of the transverse projections (78) can be about 45 degrees to the radial direction (R). In this way, the aperture portions (107) and the transverse projections (78) can generally straddle the aperture (114) that receives the anti-rotation pin (116). Thus, the structural loads on and/or weakness of the vane rings (92, 94) due to the transverse projections (78) and/or the aperture portions (107) can be offset from any weakness introduced by the addition of the aperture (114) for the anti-rotation pin (116), thereby avoiding an undue alignment of such factors.

However, other arrangements of the portions (107) and the transverse projections (78) are possible as well as the amount that the spacer connectors (50) are rotated. As an example, the portions (107) of the apertures (104, 106) can be oriented at substantially 90 degrees to the radial direction, as is shown in FIGS. 5 and 6. The spacer connectors (50) can be rotated any suitable amount to achieve any suitable angle between the transverse projections (78) and the radial direction.

It will be appreciated that systems and methods described herein can provide numerous benefits. For instance, the spacer connector system can positively lock the vane pack assembly together. Further, embodiments provided herein do not require close tolerances. In addition, embodiments described herein avoid press fits, expensive bolted joints or weld processes. Moreover, embodiments described herein allow the vane pack to be structurally decoupled from the turbine housing. These and other advantages can be realized according to embodiments herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed is:

1. A vane pack (90) for a variable geometry turbocharger comprising:
    a first vane ring (92);
    a second vane ring (94);
    a plurality of spacer connectors (50) connecting the first and second vane rings (92, 94) and maintaining a distance therebetween, the spacer connectors (50) being configured for bayonet mounting to at least one of the first vane ring (92) and second vane ring (94);
    wherein the spacer connectors (50) include a spacer body (52) having opposing end faces (58, 60), a first shaft portion (54) extending from one of the end faces (60) of the spacer body (52) to a distal end (68), and wherein a plurality of transverse projections (78) extend from an outer peripheral surface (74) of the first shaft portion (54) for bayonet mounting to the first vane ring (92), and wherein the transverse projections (78) are at substantially 45 degrees relative to a radial direction of the first vane ring (92) and at substantially 90 degrees relative to the aperture portions (107) configured to receive the transverse projections (78);
    wherein the first vane ring (92) includes a plurality of first apertures (104) having portions (107) configured to receive the transverse projections (78), each first shaft portion (54) being received in a respective one of the first apertures (104) and rotated so that the transverse projections (78) are offset from the portions (107) of the first apertures (104), whereby each first shaft portion (54) is prevented from being withdrawn from the respective first aperture (104); and
    wherein the aperture portions (107) configured to receive the transverse projections (78) are at substantially 45 degrees relative to a radial direction of the first vane ring (92).

2. The vane pack of claim 1, wherein the spacer body (52) and the first shaft portion (54) are formed as a unitary structure.

3. The vane pack of claim 1, wherein the plurality of first apertures (104) include a counterbore (108), and wherein the distal end (68) of the respective first shaft portions (54) is received in the counterbore (108) such that the distal end (68) is substantially flush with or recessed from an outer surface (96) of the first vane ring (92).

4. The vane pack of claim 1, wherein the spacer connectors (50) include a second shaft portion (56) extending from an opposite one of the end faces (58) of the spacer body (52) to a distal end (72), wherein a plurality of transverse projections (78) extend from an outer peripheral surface (76) of the second shaft portion (56) of the spacer connectors (50) for bayonet mounting to the second vane ring (94), wherein the second vane ring (94) includes a plurality of second apertures (106) having portions (107) configured to receive the transverse projections (78) of the second shaft portion (56), and wherein each second shaft portion (56) is received in a respective one of the second apertures (106) in the second vane ring (94) and rotated so that the transverse projections (78) of each second shaft portion (56) are offset from the portions (107) of the respective second aperture (106), whereby each second shaft portion (56) is prevented from being withdrawn from the respective second aperture (106).

5. The vane pack of claim 1, wherein the first shaft portion (54) of each spacer connector (50) includes a region (84) including a substantially flat surface (86).

6. The vane pack of claim 5, further including a plurality of pins (116), wherein each pin (116) is received in a respective one of a plurality of apertures (114) formed in the first vane rings (92) such that an end (118) of the pin (116) engages the substantially flat surface (86), whereby rotation of the spacer connector (50) is prevented.

7. A retention method for the vane pack (90) of a variable geometry turbocharger comprising:
    providing a first vane ring (92);
    providing a second vane ring (94);
    providing a plurality of spacer connectors (50);
    connecting each spacer connector (50) to the first and second vane rings (92, 94) such that the vane rings (92, 94) are maintained in spaced relation to each other and such that each spacer connector (50) is bayonet mounted to at least one of the first vane ring (92) and the second vane ring (94);
    wherein the spacer connectors (50) include a spacer body (52) having opposing end faces (58, 60), a first shaft portion (54) extending from one of the end faces (60) of the spacer body (52) to a distal end (68), wherein a plurality of transverse projections (78) extend from an outer peripheral surface (74) of the first shaft portion (54), wherein the first vane ring (92) includes a plurality of first apertures (104) having portions (107) configured to receive the transverse projections (78), and wherein the connecting comprises:
    inserting each of the first shaft portions (54) into a respective one of the first apertures (104);
    rotating the spacer connectors (50) such that the transverse projections (78) are offset from the portions (107) of the first apertures (104), whereby each first shaft portion (54) is prevented from being withdrawn from the respective first aperture (104); and
    wherein, after the rotating, the transverse projections (78) are at substantially 45 degrees relative to a radial direction of the first vane ring (92) and at substantially 90 degrees relative to the aperture portions (107) configured to receive the transverse projections (78).

8. The method of claim 7, wherein each of the plurality of first apertures (104) includes a counterbore (108), and wherein the rotating occurs while the distal end (68) and the transverse projections (78) of the first shaft portion (54) are located in the counterbore (108).

9. The method of claim 7, wherein the spacer connectors (50) further include a second shaft portion (56) extending from an opposite one of the end faces (58) of the spacer body (52) to a distal end (72), wherein a plurality of transverse projections (78) extend from an outer peripheral surface (76) of the second shaft portion (56) of the spacer connectors (50) for bayonet mounting to the second vane ring (94), wherein the second vane ring (94) includes a plurality of second apertures (106) having portions (107) configured to receive the transverse projections (78) of the second shaft portion (56), and wherein the connecting further comprises:
    inserting each of the second shaft portions (56) into a respective one of the second apertures (106); and
    rotating the spacer connectors (50) such that the transverse projections (78) are offset from the portions (107) of the second apertures (106), whereby each second shaft portion (56) is prevented from being withdrawn from the respective second aperture (106).

10. The method of claim 7, wherein the spacer connectors (50) include a region (84) having a substantially flat surface (86), and wherein a plurality of apertures (114) is provided in the first vane ring (92), the method further including:
provide a plurality of pins (116);
inserting each pin (116) in a respective one of the apertures (114) such that an end (118) of the pin (116) engages the substantially flat surface (86) of a respective spacer connector (50), whereby rotation of the spacer connector (50) is prevented.

11. The method of claim 7, wherein, after the rotating, the transverse projections (78) are at substantially 45 degrees relative to a radial direction of the first vane ring (92) and at substantially 90 degrees relative to the aperture portions (107) configured to receive the transverse projections (78).

12. A vane pack (90) for a variable geometry turbocharger comprising:
a first vane ring (92);
a second vane ring (94);
a plurality of spacer connectors (50) connecting the first and the second vane rings (92, 94) and maintaining a distance therebetween, the spacer connectors (50) being configured for bayonet mounting to at least one of the first vane ring (92) and the second vane ring (94);
wherein the spacer connectors (50) include a spacer body (52) having opposing end faces (58, 60), a first shaft portion (54) extending from one of the end faces (60) of the spacer body (52) to a distal end (68), and wherein a plurality of transverse projections (78) extend from an outer peripheral surface (74) of the first shaft portion (54) for bayonet mounting to the first vane ring (92), wherein the first shaft portion (54) of each spacer connector (50) includes a region (84) including a substantially flat surface (86);
wherein the first vane ring (92) includes a plurality of first apertures (104) having portions (107) configured to receive the transverse projections (78), each first shaft portion (54) being received in a respective one of the first apertures (104) and rotated so that the transverse projections (78) are offset from the portions (107) of the first apertures (104), whereby each first shaft portion (54) is prevented from being withdrawn from the respective first aperture (104);
a plurality of pins (116), wherein each pin (116) is received in a respective one of a plurality of apertures (114) formed in the first vane rings (92) such that an end (118) of the pin (116) engages the substantially flat surface (86), whereby rotation of the spacer connector (50) is prevented; and
wherein the aperture portions (107) configured to receive the transverse projections (78) are at substantially 45 degrees relative to a radial direction of the first vane ring (92).

13. The vane pack of claim 12, wherein the spacer body (52) and the first shaft portion (54) are formed as a unitary structure.

14. The vane pack of claim 12, wherein the transverse projections (78) are at substantially 45 degrees relative to the radial direction of the first vane ring (92) and at substantially 90 degrees relative to the aperture portions (107) configured to receive the transverse projections (78).

15. The vane pack of claim 12, wherein the plurality of first apertures (104) include a counterbore (108), and wherein the distal end (68) of the respective first shaft portions (54) is received in the counterbore (108) such that the distal end (68) is substantially flush with or recessed from an outer surface (96) of the first vane ring (92).

16. The vane pack of claim 12, wherein the spacer connectors (50) include a second shaft portion (56) extending from an opposite one of the end faces (58) of the spacer body (52) to a distal end (72), wherein a plurality of transverse projections (78) extend from an outer peripheral surface (76) of the second shaft portion (56) of the spacer connectors (50) for bayonet mounting to the second vane ring (94), wherein the second vane ring (94) includes a plurality of second apertures (106) having portions (107) configured to receive the transverse projections (78) of the second shaft portion (56), and wherein each second shaft portion (56) is received in a respective one of the second apertures (106) in the second vane ring (94) and rotated so that the transverse projections (78) of each second shaft portion (56) are offset from the portions (107) of the respective second aperture (106), whereby each second shaft portion (56) is prevented from being withdrawn from the respective second aperture (106).

17. A retention method for the vane pack (90) of a variable geometry turbocharger comprising:
providing a first vane ring (92);
providing a second vane ring (94);
providing a plurality of spacer connectors (50);
connecting each spacer connector (50) to the first and second vane rings (92, 94) such that the vane rings (92, 94) are maintained in spaced relation to each other and such that each spacer connector (50) is bayonet mounted to at least one of the first vane ring (92) and the second vane ring (94);
wherein the spacer connectors (50) include a spacer body (52) having opposing end faces (58, 60), a first shaft portion (54) extending from one of the end faces (60) of the spacer body (52) to a distal end (68), wherein a plurality of transverse projections (78) extend from an outer peripheral surface (74) of the first shaft portion (54), wherein the first vane ring (92) includes a plurality of first apertures (104) having portions (107) configured to receive the transverse projections (78), and wherein the connecting comprises:
inserting each of the first shaft portions (54) into a respective one of the first apertures (104);
rotating the spacer connectors (50) such that that the transverse projections (78) are offset from the portions (107) of the first apertures (104), whereby each first shaft portion (54) is prevented from being withdrawn from the respective first aperture (104);
wherein the spacer connectors (50) include a region (84) having a substantially flat surface (86), and wherein a plurality of apertures (114) is provided in the first vane ring (92), the method further including:
providing a plurality of pins (116);
inserting each pin (116) in a respective one of the apertures (114) such that an end (118) of the pin (116) engages the substantially flat surface (86) of a respective spacer connector (50), whereby rotation of the spacer connector (50) is prevented; and
wherein, after the rotating, the transverse projections (78) are at substantially 45 degrees relative to a radial direction of the first vane ring (92) and at substantially 90 degrees relative to the aperture portions (107) configured to receive the transverse projections (78).

18. The method of claim 17, wherein each of the plurality of first apertures (104) includes a counterbore (108), and wherein the rotating occurs while the distal end (68) and the transverse projections (78) of the first shaft portion (54) are located in the counterbore (108).

19. The method of claim 17, wherein the spacer connectors (50) further include a second shaft portion (56) extending from an opposite one of the end faces (58) of the spacer body (52) to a distal end (72), wherein a plurality of transverse projections (78) extend from an outer peripheral surface (76) of the second shaft portion (56) of the spacer connectors (50) for bayonet mounting to the second vane ring (94), wherein the second vane ring (94) includes a plurality of second apertures (106) having portions (107) configured to receive the transverse projections (78) of the second shaft portion (56), and wherein the connecting further comprises:

inserting each of the second shaft portions (56) into a respective one of the second apertures (106); and rotating the spacer connectors (50) such that that the transverse projections (78) are offset from the portions (107) of the second apertures (106), whereby each second shaft portion (56) is prevented from being withdrawn from the respective second aperture (106).

\* \* \* \* \*